(12) United States Patent
Ashtekar et al.

(10) Patent No.: US 7,707,520 B2
(45) Date of Patent: Apr. 27, 2010

(54) METHOD AND APPARATUS FOR PROVIDING FLASH-BASED AVATARS

(75) Inventors: Ashish Ashtekar, Sunnyvale, CA (US); Hanjoo Lim, Seoul (KR); Chintamani Patwardhan, Sunnyvale, CA (US); Henri Torgemane, Santa Clara, CA (US)

(73) Assignee: Yahoo! Inc., Sunnyvale, CA (US)

( * ) Notice: Subject to any disclaimer, the term of this patent is extended or adjusted under 35 U.S.C. 154(b) by 626 days.

(21) Appl. No.: 11/047,182

(22) Filed: Jan. 31, 2005

(65) Prior Publication Data

US 2005/0248574 A1 Nov. 10, 2005

Related U.S. Application Data

(60) Provisional application No. 60/540,690, filed on Jan. 30, 2004, provisional application No. 60/559,515, filed on Apr. 5, 2004.

(51) Int. Cl.
*G06F 13/00* (2006.01)
*G06F 15/00* (2006.01)

(52) U.S. Cl. ................... 715/855; 345/619

(58) Field of Classification Search ............ 715/706, 715/733, 715–716, 744, 700, 763–765, 853–855, 715/740–743; 345/473, 463, 619
See application file for complete search history.

(56) References Cited

U.S. PATENT DOCUMENTS 5,347,306 A 9/1994 Nitta
5,880,731 A 3/1999 Liles et al.
6,226,669 B1 5/2001 Huang et al.
6,229,533 B1 5/2001 Farmer et al.
6,404,438 B1 * 6/2002 Hatlelid et al. ............ 345/473
6,406,370 B1 6/2002 Kumagai
6,476,830 B1 11/2002 Farmer et al.
6,609,147 B1 8/2003 Matsuda et al.
6,792,406 B1 9/2004 Fujimura et al.
6,798,426 B1 9/2004 Tateishi
6,816,578 B1 11/2004 Kredo et al.
6,876,728 B2 4/2005 Kredo et al.
6,910,186 B2 * 6/2005 Kim ........................ 715/706
6,952,716 B1 * 10/2005 Robb et al. ............... 709/205
7,039,676 B1 5/2006 Day et al.

(Continued)

FOREIGN PATENT DOCUMENTS

WO WO-2005/074588 A2 8/2005

(Continued)

OTHER PUBLICATIONS

International Preliminary Report on Patentability mailed on May 10, 2007, for PCT Application No. PCT/US2005/003153, filed on Jan. 31, 2005, five pages.

(Continued)

*Primary Examiner*—Cao (Kevin) Nguyen
(74) *Attorney, Agent, or Firm*—Morrison & Foerster LLP

(57) ABSTRACT

Method and apparatus for providing flash based online identities is disclosed. For example, the present invention applies a multimedia animation component such as a Flash component in the present avatars architecture. In one embodiment, each avatar is represented using a plurality of layers, where each layer employs at least two objects. Using two objects for each layer allows the present invention to minimize flicking when the avatar is animated.

21 Claims, 9 Drawing Sheets

U.S. PATENT DOCUMENTS

| | | | |
|---|---|---|---|
| 2002/0007276 | A1 | 1/2002 | Rosenblatt et al. |
| 2003/0011643 | A1 | 1/2003 | Nishihata |
| 2003/0156134 | A1 | 8/2003 | Kim |
| 2004/0148346 | A1 | 7/2004 | Weaver et al. |
| 2004/0179037 | A1 | 9/2004 | Blattner et al. |
| 2004/0179038 | A1 | 9/2004 | Blattner et al. |
| 2004/0179039 | A1 | 9/2004 | Blattner et al. |
| 2004/0189702 | A1 | 9/2004 | Hlavac et al. |
| 2005/0071429 | A1 | 3/2005 | Hettish et al. |
| 2005/0071506 | A1 | 3/2005 | Hettish |
| 2005/0108329 | A1 | 5/2005 | Weaver et al. |
| 2005/0132305 | A1* | 6/2005 | Guichard et al. ............ 715/855 |
| 2005/0163379 | A1 | 7/2005 | Zimmermann |
| 2005/0165584 | A1 | 7/2005 | Boody et al. |
| 2005/0216529 | A1 | 9/2005 | Ashtekar et al. |
| 2005/0223328 | A1 | 10/2005 | Ashtekar et al. |
| 2007/0002057 | A1* | 1/2007 | Danzig et al. ............... 345/473 |
| 2007/0113181 | A1 | 5/2007 | Blattner et al. |
| 2007/0168863 | A1 | 7/2007 | Blattner et al. |
| 2008/0007567 | A1* | 1/2008 | Clatworthy et al. ......... 345/619 |

FOREIGN PATENT DOCUMENTS

| | | |
|---|---|---|
| WO | WO-2005/074596 A2 | 8/2005 |
| WO | WO-2005/074596 A3 | 8/2005 |

OTHER PUBLICATIONS

International Search Report mailed on Apr. 4, 2007, for PCT Application No. PCT/US2005/03153, filed on Jan. 31, 2005, three pages.

International Search Report mailed on Jul. 15, 2008, for PCT Application No. PCT/US05/03073, filed on Jan. 31, 2005, four pages.

Written Opinion mailed on Jul. 15, 2008, for PCT Application No. PCT/US05/03073, filed on Jan. 31, 2005, five pages.

Non-Final Office Action mailed on May 16, 2007, for U.S. Appl. No. 11/047,140, filed Jan. 31, 2005, eight pages.

Amendment in Response to Non-Final Office Action submitted on Nov. 15, 2007, for U.S. Appl. No. 11/047,140, filed Jan. 31, 2005, nine pages.

Final Office Action mailed on Mar. 4, 2008, for U.S. Appl. No. 11/047,140, filed Jan. 31, 2005, twelve pages.

Amendment with Request for Continued Examination mailed on Apr. 29, 2008, for U.S. Appl. No. 11/047,140, filed Jan. 31, 2005, eight pages.

Non-Final Office Action mailed on Jun. 9, 2008, for U.S. Appl. No. 11/047,140, filed Jan. 31, 2005, twelve pages.

Amendment in Response to Non-Final Office Action submitted on Jul. 28, 2008, for U.S. Appl. No. 11/047,140, filed Jan. 31, 2005, nine pages.

Non-Final Office Action mailed on Jun. 27, 2008, for U.S. Appl. No. 11/047,010, filed Jan. 31, 2005, seven pages.

Final Office Action mailed on Oct. 17, 2008, for U.S. Appl. No. 11/047,140, filed Jan. 31, 2005, twenty pages.

* cited by examiner

METHOD AND APPARATUS FOR PROVIDING FLASH-BASED AVATARS

This application claims the benefit of U.S. Provisional Applications No. 60/540,690 filed on Jan. 30, 2004 and No. 60/559,515 filed on Apr. 5, 2004, which are herein incorporated by reference.

BACKGROUND OF THE INVENTION

1. Field of the Invention

The present invention relates generally to a method and apparatus for providing online identities, e.g., known as avatars. More specifically, the present invention relates to a method and apparatus for providing flash based online identities.

2. Description of the Related Art

Avatars are characters that users can create and customize to represent themselves when interacting with others on a network, such as the Internet. Avatars bring to life an online identity that members create to represent themselves through the use of a graphical representation. Since an avatar is an image that is created by a user to represent the user's online identity, the user has discretion as to how the avatar will look. For example, the users can change their avatars by changing the clothes, accessories and hairstyles. Once the avatars are created, they can be saved and used by the users as their online identities. However, once created, the avatars are often static.

Thus, there is a need in the art for a method and apparatus for providing flash based online identities.

SUMMARY OF THE INVENTION

In one embodiment, the present invention provides flash based online identities. For example, the present invention applies a multimedia animation component such as a Flash component in the present avatars architecture. In one embodiment, each avatar is represented using a plurality of layers, where each layer employs at least two objects. Using two objects for each layer allows the present invention to minimize flicking when the avatar is animated.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, wherever possible, to designate identical elements that are common to the figures.

DETAILED DESCRIPTION OF THE PREFERRED EMBODIMENT

Figure 1:
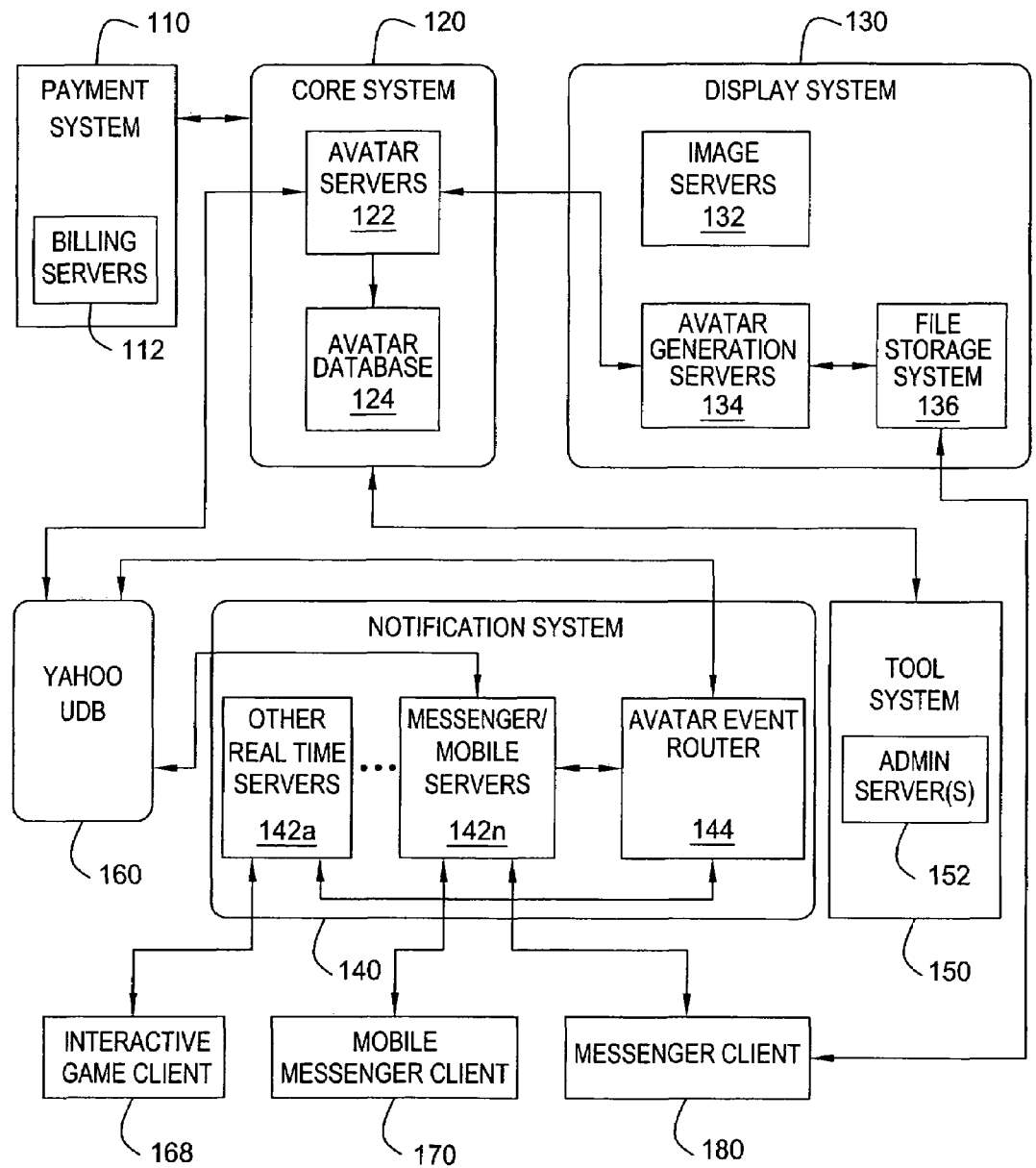
FIG. 1 illustrates an architecture of a system for providing online identities in accordance with the present invention.

FIG. 1 illustrates an architecture of a system 100 for providing online identities in accordance with the present invention. The system 100 comprises a payment system 110, a core system 120, a display system 130, a notification system 140, a tool system 150, and a user database (UDB) 160. Although the present system is illustrated as comprising a plurality of separate systems, the present invention is not so limited. Namely, greater or lesser number of systems can be deployed to perform the functions as described below. In fact, various systems as described below can be omitted if the functions supported by these systems are not deployed for a particular implementation. Additionally, although the user database (UDB) 160 is illustrated as a separate module, the present invention is not so limited. Namely, the user database (UDB) 160 can be deployed or distributed within one or more of the above systems.

In one embodiment, a payment system is optionally employed. The payment system employs one or more billing servers 112 that allow users to purchase points in bulk. The purchased points can be used to purchase items such as special accessories, e.g., from an avatar store, for the users' online identities. Thus, a user may charge his or her credit card via the payment system to purchase "n" points that can be spent on avatar items. In one embodiment, the payment system 110 is extensible to support integration with $3^{rd}$ party billing, e.g., telephone charge billing and/or internet service billing.

In one embodiment, the core system 120 comprises one or more dedicated servers 122 for processing and handling avatar operations. For example, the core system 120 serves as the main entry points for users to browse and select items to purchase and wear for their avatars. The core system also comprises an avatar database 124 for holding avatar site data stored in a relational database and user data, stored in the User Database 160.

In one embodiment, the display system 130 comprises one or more generation servers 134 and one or more image servers 132, where these servers are tasked with the generation and display of the avatars. For example, the display system 130 can either fetch avatar files from the storage system 136, or generate them on the fly, caching the results on the storage system 136. The storage system 136 may also keep pre-generated avatar files for other services (e.g., provided by a service provider) to obtain through a web interface.

In one embodiment, the notification system 140 comprises one or more real time servers 142a-n, and at least one router 144 for routing avatar events. In operation, the avatar event router 144 in conjunction with messenger or mobile servers determines if an avatar user is logged into a real time notification service. This notification service can be made free of charge to a user or it can be subscribed to by a user for a small fee. If the query is positively answered, then the avatar event router 144 will pass notifications to the pertinent servers (142*a-n*) as required. To illustrate, if the user's avatar has experienced a change (e.g., a mood change, a clothing change, a background change, an accessory change and so on) and the user is logged into a real time notification service, then the avatar change is sent via the notification system so that the change is presented in real-time. For example, FIG. 1 illustrates messenger/mobile servers 142*n* sending an avatar change notification to a mobile instant messenger client 170, for displaying an updated avatar to a mobile device and/or to a messenger client 180 for displaying an updated avatar to an instant messenger application, e.g., running on a personal computer (PC).

In one embodiment, one of the real time servers 142*a* can be a gaming server, which is coordinating and executing a gaming function for one or more users. In one embodiment, the gaming server 142*a* may interact with the avatar event router 144 such that avatar change notifications can be exchanged between the two devices. To illustrate, during a real time interactive game between two users, one of the users can cause his avatar to express an angry expression, e.g., for losing a point in the game, for losing a piece on a board game, for being "hit" in a game and so on. Alternatively, the user can cause his avatar to express a yawning expression, e.g., when the user's gaming character is hiding and waiting to be found and so on. Thus, the avatars can be used to allow players in a game to express their moods and/or to communicate gestures. Namely, it allows the players of an interactive game another avenue of interaction aside from the game itself.

The expressions of the avatars can be initiated when the user activates an icon as further discussed below. Alternatively, a game manufacturer can design a function into the game such that players can inform the game during setup whether avatars have been defined by the players. If avatars are defined and activated, the game can send signals to the users such that the users' avatars may express certain moods and/or gestures in accordance with the status of the interactive game. For example, if a user loses a point (or is hit) in a game, the corresponding user's avatar who suffered the loss may automatically exhibit an angry expression (or any expression as defined by the user). Similarly, the user who caused the loss of the point by another user (or who caused hit) may have his avatar automatically exhibit a happy expression (or any expression as defined by the user). Again, this feature enhances interactive gaming by allowing users to exhibit moods and/or gestures that are often absent in interactive gaming.

In one embodiment, the tool system 150 comprises one or more administration servers 152 for performing production, maintenance, and/or customer care functions. In one embodiment, the administration servers 152 may also allow third parties to submit content for approval, e.g., new representations (images and/or animation) of avatars, new accessories for avatars, new moods for avatars, new services for avatars, and so on. The tool system allows the service provider to evaluate the submitted contents provided by third parties and to allow the service provider to update, modify or remove old contents. Finally, it should be noted that the system 100 is only exemplary, and can be modified to suit the requirement of a particular implementation.

In one embodiment, users are given limited free avatar customization abilities, and can then buy new combinations of hairstyles, clothes, accessories, and backgrounds for their avatar through a web-based storefront. In one embodiment, avatars are integrated into the Messenger client in a Friend List and/or instant-message (IM) window, e.g., a YAHOO! IM window. Users may express themselves online with multiple moods and/or gestures. Users may customize their avatars by buying points that can then be spent on avatar outfits, accessories, and backgrounds. Customization may take place through a web-based interface, and once complete, can be displayed or "shown off" through the Messenger, Mobile or Games client to friends and family.

FIG. 1 illustrates a block diagram depicting an exemplary embodiment of a real-time notification system in accordance with one or more aspects of the present invention. To illustrate, whenever a user creates a new avatar or changes an existing avatar, the avatar core servers 122, write the user's avatar to a service provider's unified database 160, e.g., the YAHOO! UDB. The avatar event router 144, which is continuously listening for any changes to a user's record in the UDB 160 for avatar related information, picks up the avatar change notification. The avatar event router 144 sends the avatar information to the pertinent messenger and mobile servers 142*n*, which then look up the user's messenger/mobile connection information and send an "avatar changed" event to the user himself and also to anyone who is logged into Messenger and has the user in his/her buddylist.

In one embodiment, the avatar change notification may comprise one or more of the following elements:

1. ID (e.g., a YAHOO! ID) of the user whose avatar has changed;
2. The country platform (e.g., US, Korea, Taiwan, and the like) of the user who's avatar has changed;
3. An avatar key which contains all pertinent avatar information, such as a list of all items the avatar was wearing, the avatar gender, the avatar skin tone, the avatar hair color, the avatar eye color, the avatar background, and the like;
4. Any zoom co-ordinates associated with the avatar; and
5. Is the user showing his avatar with anyone who has the user in his/her Messenger buddy list.

In one embodiment, when the Messenger client, e.g., 180 receives an avatar change notification, the client caches the avatar key of the user and downloads the pertinent size (e.g., small, medium and large) of the avatars from the appropriate avatar platform where the user created his avatar. Once the small, medium and/or large avatars are downloaded on the client, the client shows the small avatar of the user in the messenger buddy list and the medium avatar of the user at the top of the Messenger client. If the user is having a Messenger conversation with another user, the full avatar is shown in the Messenger conversation (e.g., IM) window. If a user deletes his avatar, the avatar core servers 122 will delete the avatar information from the users record in the UDB 160 and an "avatar changed notification" is sent to the user himself and to anyone who has the user in his/her Messenger buddy list.

Figure 2:
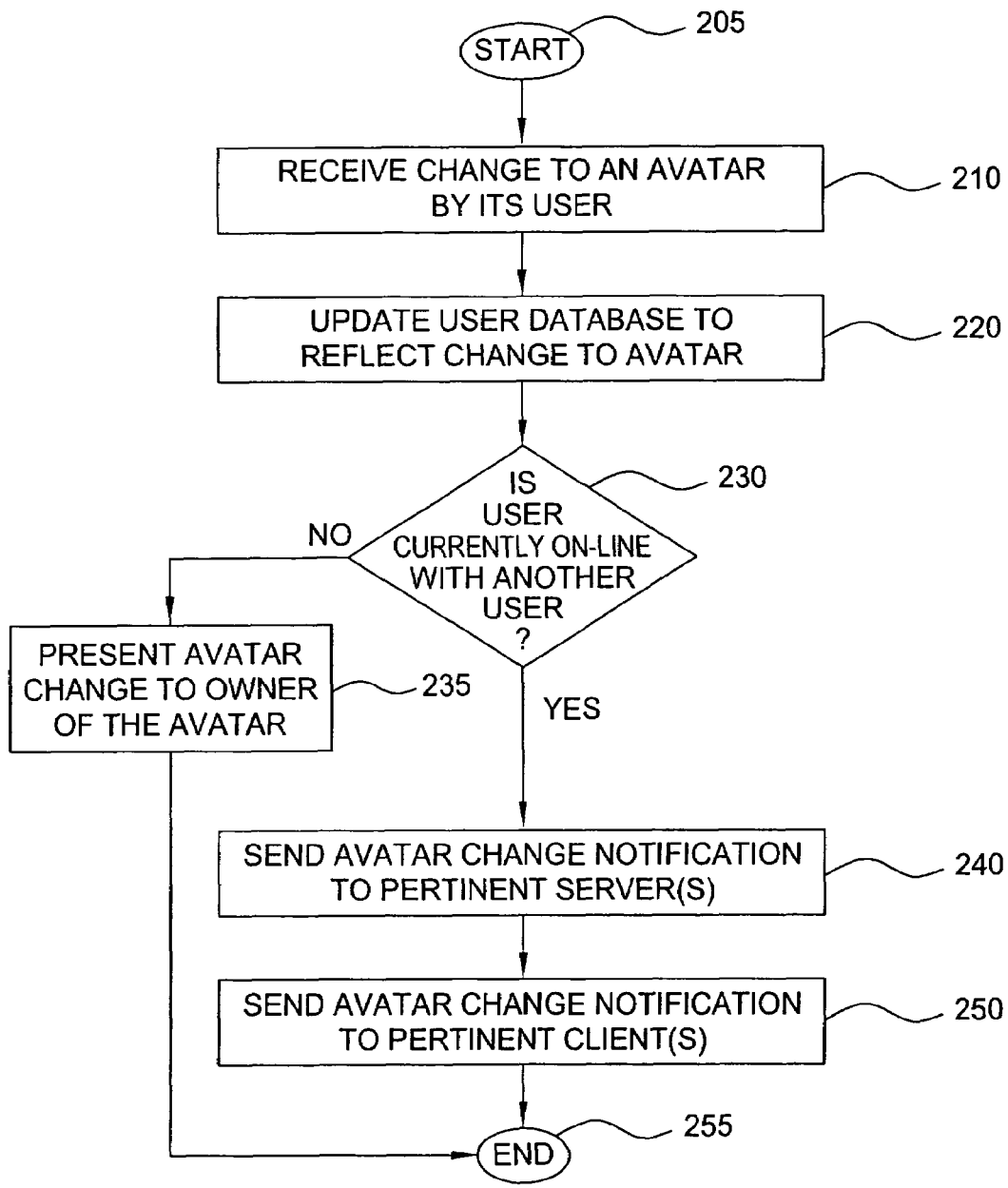
FIG. 2 illustrates a flow chart of an exemplary method for providing real time notification of avatar changes.

FIG. 2 illustrates a flow chart of an exemplary method 200 for providing real time notification of avatar changes. Method 200 starts in step 205 and proceeds to step 210.

In step 210, method 200 receives a change to an avatar by a user. The change may be a change in the appearance of the avatar, e.g., a change in the clothing, the skin tone, the hair color, the eye color, accessories, the moods, and/or gestures related to the avatar.

In step 220, method 200 updates the change in a user database to reflect the change to the user's avatar. For example, the change can be saved to a unified database.

In step 230, method 200 queries whether the user is currently online with another user, e.g., chatting with another user using an instant messenger application, playing an interactive game and so on. If the query is positively answered, then method 200 proceeds to step 240. If the query is negatively answered, then method 200 proceeds to step 235, where the avatar change is implemented and the updated avatar is presented to the user for viewing.

In step 240, method 200 sends an avatar notification to the pertinent server(s) that may need to send real time notification, e.g., a messenger server, a mobile messenger server, a gaming server, and the like. The pertinent servers are servers supporting online applications that the user is currently engaging in with another user.

In step 250, method 200 sends an avatar change notification to pertinent client(s), e.g., a mobile messenger client 170, a messenger client 180, or an interactive game client 168. The change to the user's avatar is shown to the user and to other users who are currently online with the user. Method 200 then ends in step 255.

One feature of the avatar is the ability to express different moods and/or gestures. This is an important feature because it enhances the interactive nature of various on-line applications such as instant messenger, interactive gaming and so on. Seeing the action in an interactive gaming environment and seeing a text message in an instant messenger application from another user certainly provide a high level of real time interaction between users, but seeing simulated moods and/or gestures of the avatars further enhances the realism of the interaction. In one embodiment, an avatar can support five moods, e.g., normal (or straight face), smiling, happy, sad, and angry. However, additional moods and/or gestures may include but not limited to: winking, big grin, batting eyelashes, big hug, confused, love struck, blushing, sticking out tongue, kiss, broken heart, surprised, smug, cool, worried, whew!, devil, angel, raised eyebrow, rolling on the floor, nerd, talk to the hand, sleepy, rolling eyes, loser, sick, don't tell anyone, not talking, clown, silly, party, yawn, drooling, thinking, d'oh, applause, nailbiting, hypnotized, liar, waiting, sigh, and cowboy.

Figure 3:
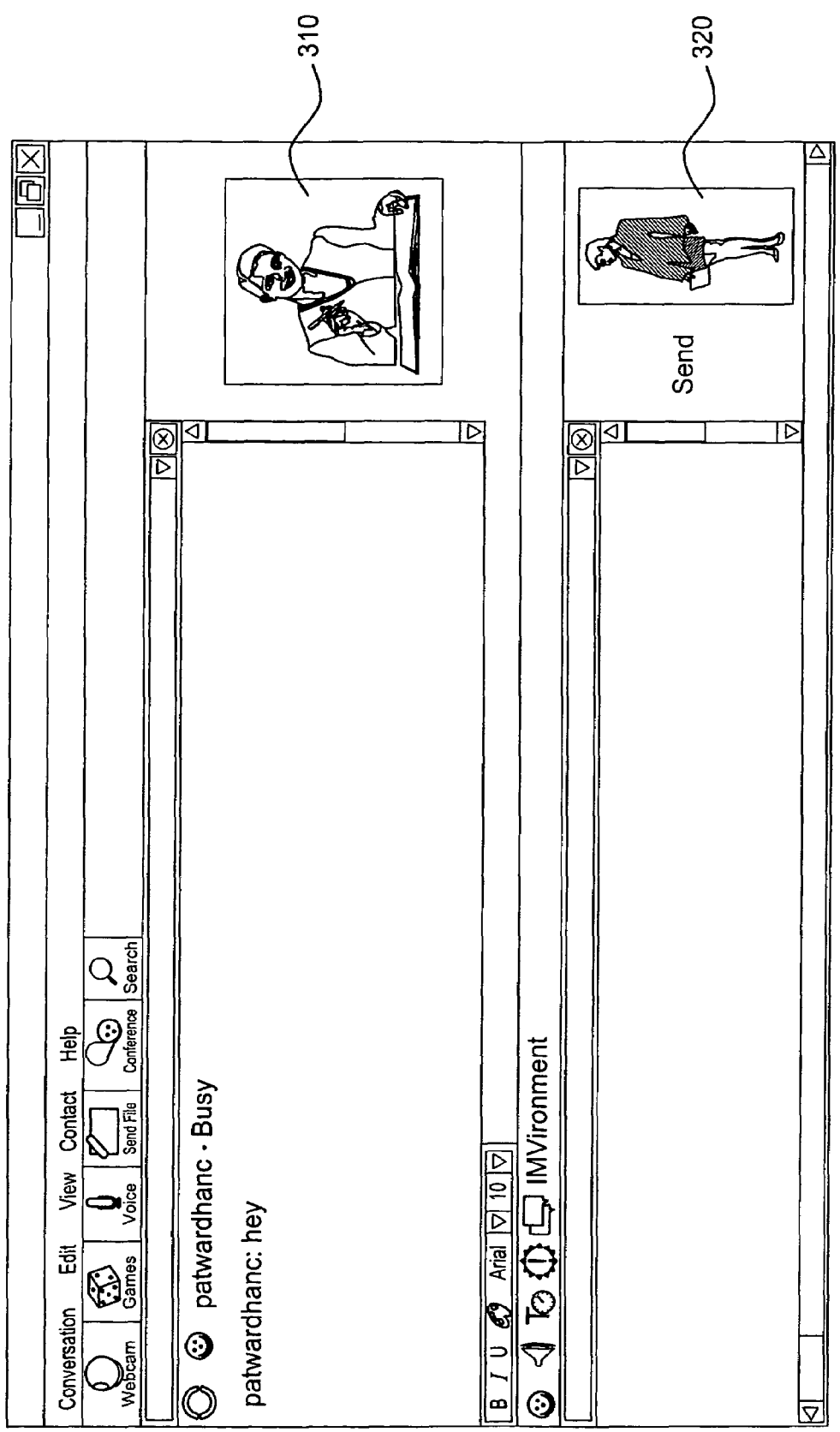
FIG. 3 illustrates an IM window of a messenger client showing two avatars of two users.

In one embodiment, when a user creates an avatar with a service provider, e.g., YAHOO!, he/she can select one of the moods as a persistent mood for his avatar. If a user doesn't explicitly select a mood, the "normal mood" or straight face mood is the default mood. When an avatar change notification is sent to the user and anyone who has the user in his/her buddy list in the context of instant messenger (IM), the persistent mood is displayed in the avatars. To illustrate, FIG. 3 illustrates an IM window 300 of a messenger client showing two avatars of two users where both avatars currently have a normal mood. For example, the avatar 310 is representative of a remote user, whereas the avatar 320 is representative of a local user.

Figure 4:
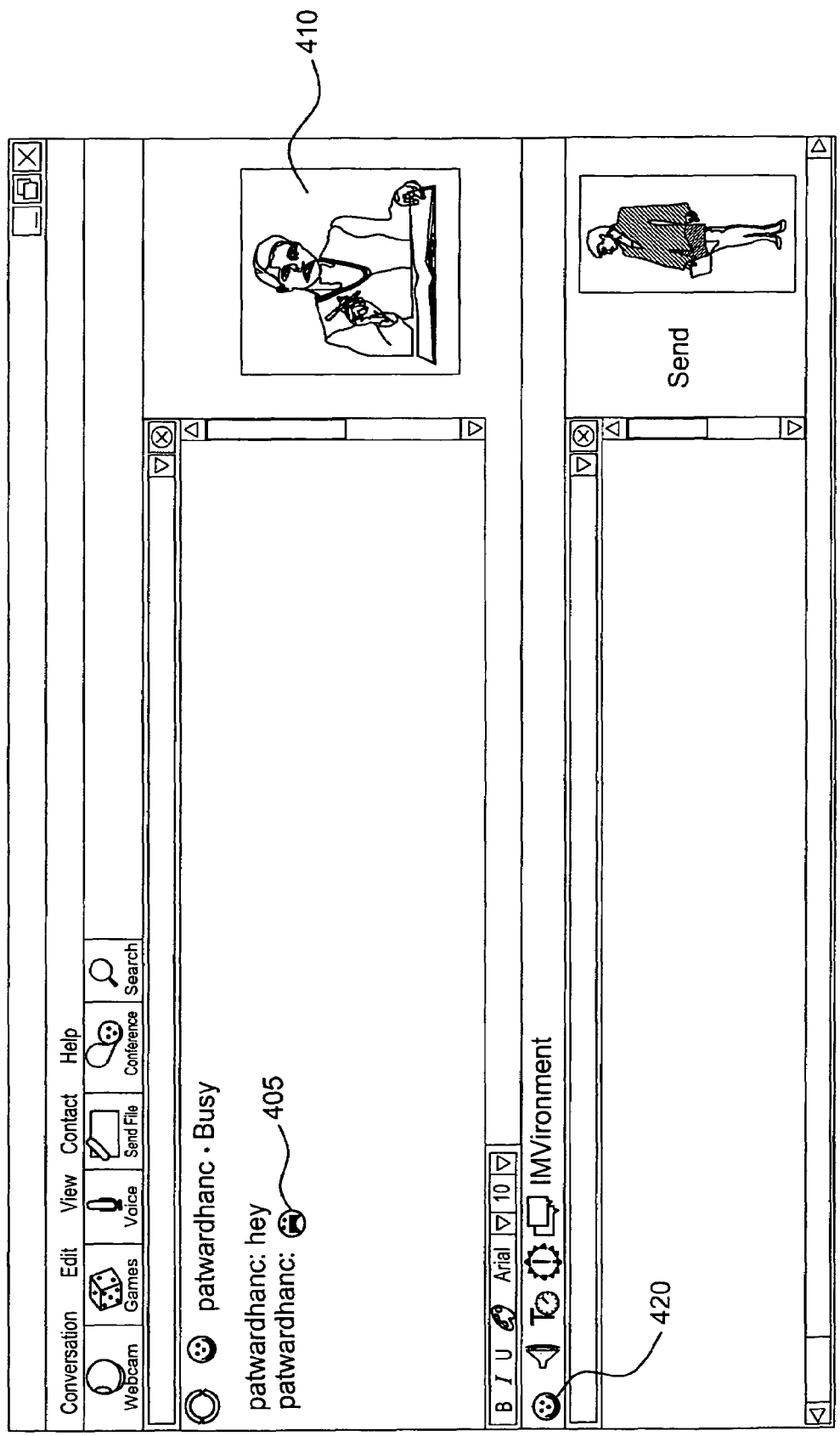
FIG. 4 illustrates an IM window of a messenger client with an avatar having a new mood from that of FIG. 3 in response to an emoticon smiley.

In this example, when the remote avatar user is having an IM conversation with another user, he can change his avatar mood (dynamically) by typing an icon, e.g., an "emoticon smiley" in the messenger IM window. The avatar mood changes from the persistent mood to the new mood and may then revert back to the persistent mood. For example, FIG. 4 illustrates an IM window 400 of a messenger client with an avatar 410 having a new mood from that of FIG. 3 in response to an emoticon smiley 405. In one embodiment, a plurality of emoticon smileys is predefined such that a user can select one or more of them from a pull-down menu 420. Alternatively, each emoticon smiley 405 can be assigned a particular set of keystrokes, e.g., a crying emoticon smiley can be activated by typing ":((", or a happy emoticon smiley can be activated by typing ":)", and so on.

The ability to dynamically change the mood and/or gestures of the avatars provides a unique way to allow users to express their simulated mood and/or to express a simulated gesture. Using the dynamic moods of the avatars, the service provider is able to provide the users with a private way to express themselves without resorting to the use of web cameras where the users are allowing the other users to see them. For privacy reasons and/or resource reasons, avatars serve as simulated representations of the users that allow the users to express themselves freely. The dynamic nature of the avatars enhances the user's interactive experience while maintaining privacy.

In one embodiment, the mood of the avatar is dynamically changed by an external trigger. In other words, it does not require the user to manually select or activate an emoticon. For example, in the context of IM, the IM application can be implemented with a method for detecting terms that may trigger an avatar change notification. For example, the IM application may monitor for terms such as "sad, gloomy, miserable, angry, annoyed, irritated, livid, mad, furious, infuriated, up in arms, depressed, unhappy, dejected, disheartened, shocked, sick, ailing, unwell, queasy, tired, weary, exhausted, worn-out, drained, bushed, sleepy, frustrated, aggravated, upset, disturbed, sorry, remorseful, regretful, glad, happy, pleased, cheerful, joyous, delighted, contented, cheery" and so on. This listing of possible monitored terms is only exemplary. Detecting such term(s) after or within a certain number of words from the phrase "I am . . . ", "I feel . . . ", and so on, may trigger a change to the avatar of the user. For example, detecting the phrase "I am . . . sad . . . " may cause the avatar of the user to dynamically change to a sad expression for a brief moment. Similarly, for example, detecting the phrase "I am . . . pleased . . . " may cause the avatar of the user to dynamically change to a happy expression for a brief moment. This dynamic feature allows the user to simply engage in the conversation within the IM environment without having to manually select or type an emoticon to implement a change in the avatar.

In one embodiment, the dynamic feature can be implemented by the service provider, where the user allows the service provider liberty to attempt to interpret the user's conversation for the purpose of altering the mood of the user's avatar. Alternatively, the service provider can offer the user a service or an option where the user can predefine various words to be correlated to certain avatar moods and/or gestures.

In another embodiment, the external trigger can be an interactive game. The game designer can design a feature into the game where during game setup, the game application can request whether the players have avatars. Those players who have avatars can have changes applied to their avatars during the interactive game. For example, signals from the games relating to losing a point, losing a game, losing an item in the game, losing a piece on a board game, being "hit" by another player, scoring a hit, winning a point, capturing a piece, winning a game and so on, can be used as external triggers to briefly change the avatars of the users. For example, a user's game character being hit by another player may cause the user's avatar to briefly express an angry expression or a painful expression. It should be noted that the user's game character is not the user's avatar. Alternatively, the avatar of the player who scored the hit can be changed to briefly express a happy or smug expression. This dynamic mood feature enhances the realism of the interaction of the user by simulating the users' moods and gestures.

Figure 5:
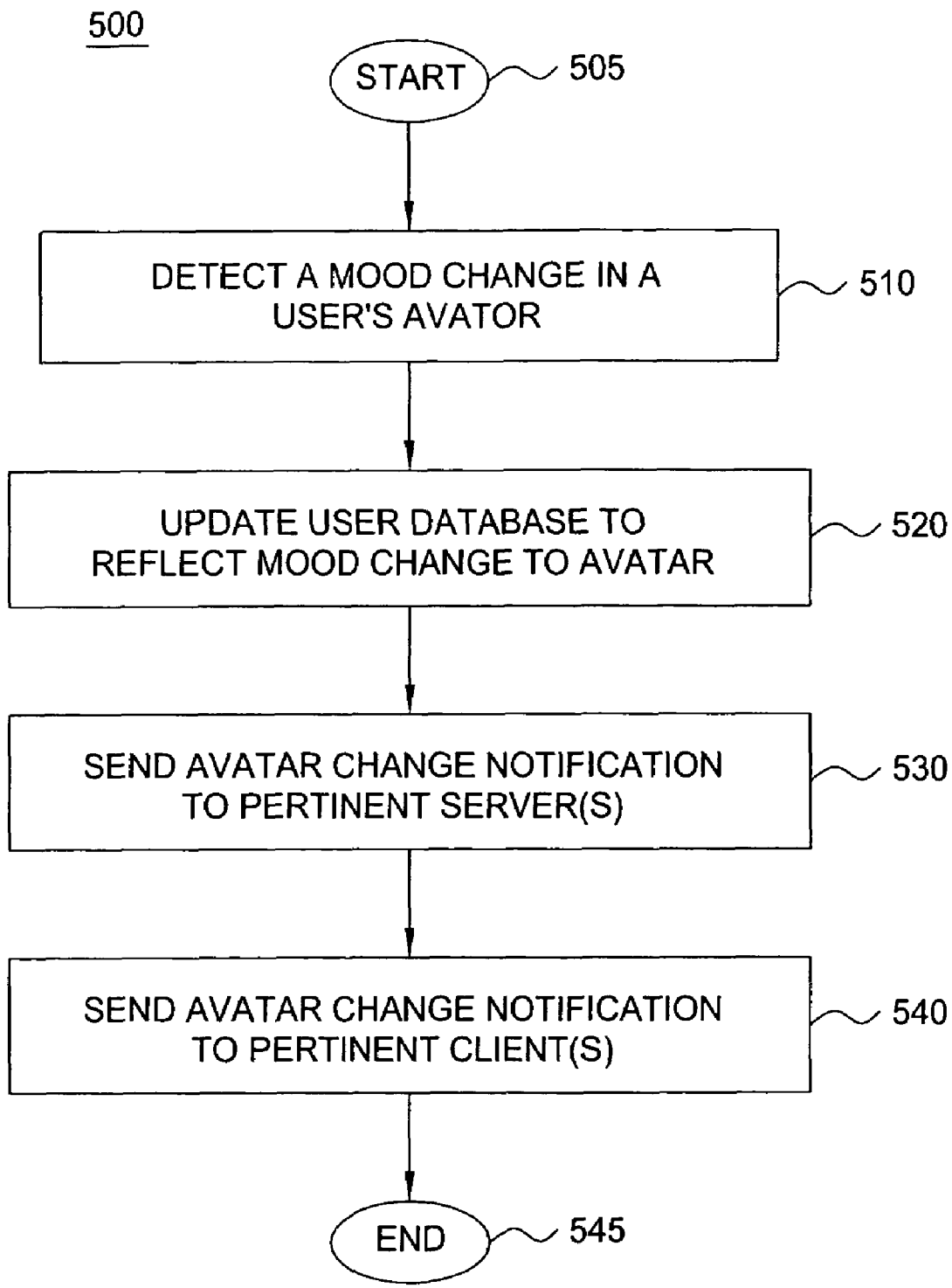
FIG. 5 illustrates a flow chart of an exemplary method for providing real time notification of avatar mood and/or gesture changes.

FIG. 5 illustrates a flow chart of an exemplary method 500 for providing real time notification of avatar mood changes. Method 500 starts in step 505 and proceeds to step 510.

In step 510, method 500 detects a mood and/or gesture change to an avatar of a user. In one embodiment, the detection can be based on receiving a manual signal from the user who has selected or typed a pertinent emoticon to change the mood of the user's avatar. Alternatively, the mood and/or gesture change is dynamically detected, e.g., by monitoring the text message of the user in the context of an IM environment or by monitoring output signals from a game in the context of an interactive gaming environment.

In step 520, method 500 updates the mood change in a user database to reflect the change to the user's avatar. For example, the change can be saved to a unified database.

In step 530, method 500 sends an avatar mood change notification to the pertinent server(s) that may need to send real time notification, e.g., a messenger server, a mobile messenger server, a gaming server, and the like. The pertinent servers are servers supporting online applications that the user is currently engaging in with at least one other user.

In step 540, method 500 sends an avatar mood change notification to pertinent client(s), e.g., a mobile messenger client 170, a messenger client 180, or an interactive game client (168). The change to the user's avatar mood and/or gesture is shown to the user and to other users who are currently online with the user. Method 500 then ends in step 545.

In one embodiment, the avatars architecture 100 of FIG. 1 utilizes a multimedia animation component, such as a Flash component that is compatible with Macromedia Flash MX 2004. Macromedia Flash or Flash is a graphics animation program, written and marketed by Macromedia, that uses vector graphics. The resulting files, called SWF files, may appear in a web page to view in a web browser, or standalone Flash players may "play" them. Although the present invention is described in one embodiment as employing the Flash technology, the present invention is not so limited. Other animation programs can be adapted for the present invention.

In one embodiment, there are two flash modules (e.g., the Avatar Display Host module and the Pan/Zoom Control module) in the avatars portal that is implemented within the display system 130 of FIG. 1, and one module in the Messenger client, e.g., 170 or 180.

The avatar display host displays the composed avatar representation. In one embodiment, the composition process is dynamic, where wardrobe pieces, body parts and props are being loaded into and unloaded from the Host file, in accordance with user input. The Host file serves as a blank canvass, ready to incorporate any item offered in the avatar's collection.

The Flash logic of the present invention will now be disclosed. The Host file contains one empty "MovieClip" (e.g., MovieClips are the Flash intrinsic objects that may contain a single or multiple graphics, static and animated). That MovieClip (e.g., referred to as avatar_mc) is positioned at the coordinates (0,0), which correspond to the upper left corner of the canvas. When the Host file is invoked (being loaded into the avatar's webpage), avatar_mc creates 70 new empty MovieClips within itself, e.g., 2 MovieClips for each layer, as predefined by the avatars architecture in one embodiment.

Each of the layer MovieClips inherits the (0,0) coordinates from its parent avatar_mc. Each of the layer MovieClips can hold exactly one item at a time, i.e., meaning that only one item can be positioned in each layer at any given time. In one embodiment, an avatar can wear only one top, one bottom and can have only one head, only one hairstyle, etc.

However, as mentioned above, two MovieClips are being created for each layer in order to address the "flickering" effect. Flicker occurs when Flash is loading something into a MovieClip that already contains another item. First Flash unloads the current item, and then it starts loading the new item. Regardless of how fast the process is, the unloading process is always much faster than loading, thus there is a time gap between the moment the Flash discards an item, and the moment it displays the newly loaded one. Apparently, the human eye is fast enough to catch that time gap even if it only lasts a fraction of a second.

In one embodiment, anti-flickering logic of the present invention designates two MovieClips for each layer. Each takes turn of playing a role of "catcher" (MC which loads the new item) and "waiter" (MC which contains the old item). When the avatar display host first loads into the avatar's web page, the logic of the page dresses the avatar in previously saved items (or the default items for the first-time users). Each layer designates one of its MCs to be the catcher. Catcher loads the item and displays it until user decides to remove the item or substitute it with another one.

Figure 6:
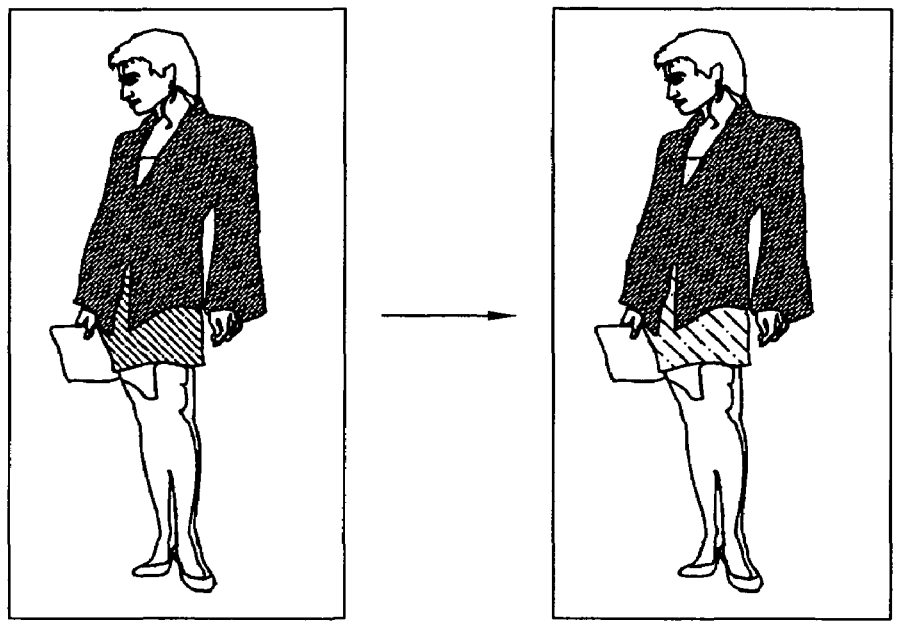
FIG. 6 illustrates the replacement of an avatar item.

If the user simply removes the item then it happens instantaneously. If however, the user decides to replace an item with another one, the catcher-waiter logic of the present invention will engage. To illustrate, the avatar is wearing a green dress, which the user replaces with a blue dress, as illustrated in FIG. 6. The MC containing the green dress plays the role of waiter, where it will keep the green dress until it receives a signal that it is acceptable to unload it. The available MC is now a catcher, where it starts loading the file with the blue dress file. As soon as the loading starts, yet another MC called the "watcher" becomes involved. In one embodiment, watcher checks on the progress made by catcher (currently this repeated checking occurs every 0.125 sec, or 8 times/sec). As soon as the catcher loads the new file completely, the watcher gives a signal to the waiter to unload the old item. Now both actions occur at the same moment.

Flickering may still occur if the user removes an item explicitly or if the new item and current item(s) are in different layers. For example, choosing a pair of pants while the avatar is wearing a dress will remove the dress (e.g., in layers 9 and 17) and substitutes it with a newly chosen bottom (e.g., layer 10) and previously saved, or default top (e.g., layers 11 and 16). It is important to note that even though in one embodiment, the avatar comprises 35 layers and 70 MovieClips, they all are parts of one top level MovieClip, e.g., avatar_mc. This makes it easy to move the avatar around and scale it up and down, where such actions are important for the implementation of Pan/Zoom Control, the next Flash component.

Figure 8:
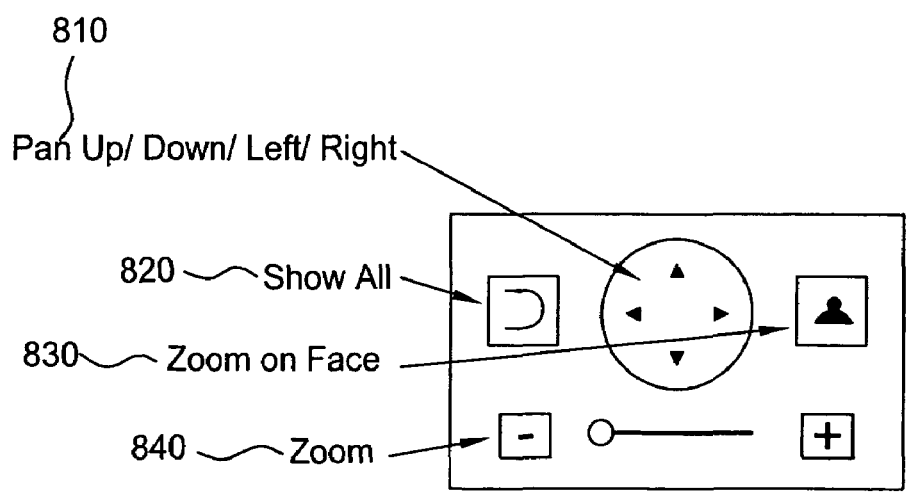
FIG. 8 illustrates the pan and zoom control of FIG. 7.
Figure 7:
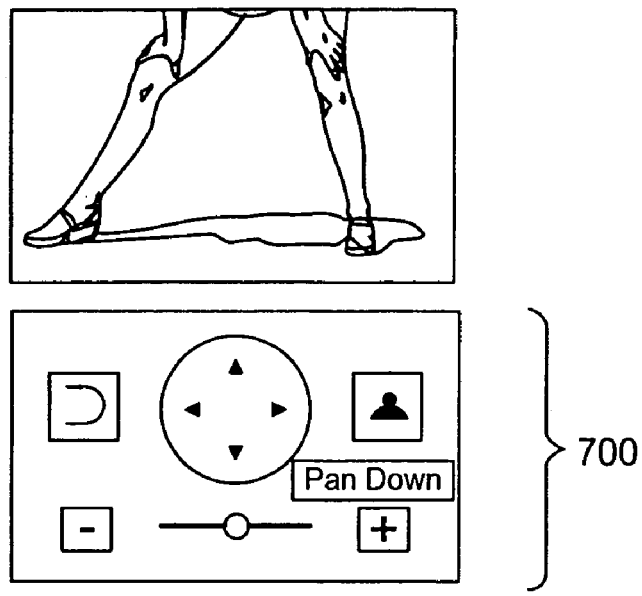
FIG. 7 illustrates a pan and zoom control with an avatar.

In one embodiment, the Flash Movie simply passes the Pan and Zoom commands to the host webpage JavaScript logic, which in turn delegates it to the avatar display Host. As shown in FIGS. 7 and 8, the central Pan and Zoom wheel 700 comprises four (4) buttons 810, 820, 830 and 840. Button 810 allows the user to pan up, down, left and right to view the avatar. Button 820 allows the user to view the entire avatar. Button 830 allows the user to quickly view only the face of the avatar. Button 840 allows the user to zoom in or out in increments to view the avatar.

Each of the panning buttons sends the command to the JavaScript via technique known as "FSCommand" (the communication method that Flash Player communicates with JavaScript). Avatar display host contains a MovieClip called "zoomer_mc". Zoomer_mc watches for the signals coming from the JavaScript. Those signals are commands to nudge avatar_mc to the right, left, up or down (e.g., when user clicks on one of the buttons found on the central panning wheel of the Pan/Zoom Control 700.

In one embodiment, each nudge moves the avatar_mc 10 pixels. If user presses and holds a button, repeated commands are being sent to the JavaScript and further to the avatar display host with the frequency 18 commands/sec that provides an illusion of smooth movement. Zoomer will move avatar_mc until the edge of avatar_mc hits the edge of avatar host canvas. The user cannot move the avatar past the edges of the canvas. If the user still tries to move the avatar, a bum-like motion occurs, thereby giving an illusion of resistance.

In one embodiment, the actual movement of the avatar occurs in the direction, opposite to the button label arrows. For example, panning "down" moves the avatar "up", thereby providing an illusion of a camera panning down the vertical axis of the screen.

In one embodiment, zooming in and out occurs in a similar fashion. Clicking and/or pressing the zoom in/out buttons moves the zoom slider 840 along the horizontal line. The slider will not move beyond the line's edges. User can also drag the slider right or left. For every movement of the slider, pan/zoom control sends the command to the JavaScript, which in turn delegates the command to avatar display host. Just like with the panning, repeated movement of slider results in repeated commands being sent to the JavaScript with speed 18 commands/sec, giving an illusion of smooth zooming.

Figure 9:
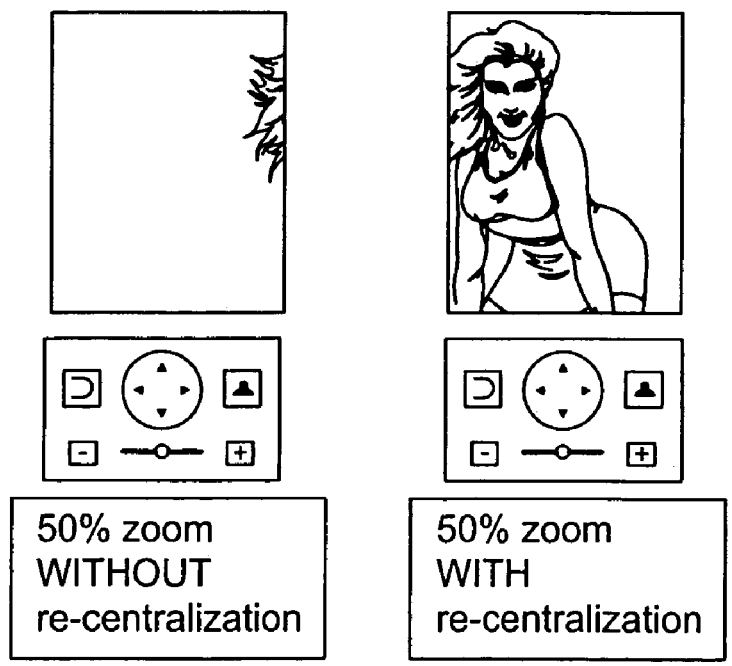
FIG. 9 illustrates an avatar with 50% zoom without re-centralization, and an avatar with 50% zoom with re-centralization.

In one embodiment, zoom control does not inform the JavaScript how much should the avatar be zoomed in/out. It only sends the relative position of slider with 0 being the leftmost position and 1 being the rightmost. When zoomer MovieClip in avatar display host receives the information, it interprets the scale, according to the values of MIN and MAX allowed zoom. In one embodiment, the Max Zoom is set to 400%, whereas the Min Zoom is 100%. Every time the avatar_mc is rescaled, it is also being re-centralized. Namely, it is necessary to reposition avatar_mc because all the scaling is based on the original positions of avatar_mc (0,0), which means that it "grows" from the top left corner. Smart re-centralization of the MovieClip gives the user an illusion that he is zooming in on the face of the avatar, rather than simply resizing the canvas. FIG. 9 illustrates an avatar with 50% zoom without re-centralization, and an avatar with 50% zoom with re-centralization.

In one embodiment, the shortcut buttons "Show All" 820 and "Zoom on Face" 830 allow the user to move to pre-defined position with one click. Show All zooms out to 100% with the avatar being positioned at original (0,0) coordinates. Zoom to Face zooms close enough to display the close-up of the avatar's face. The scale of Zoom to Face is currently set to 316% with the avatar positioned at (−160, −10) coordinates.

In one embodiment, the pan/zoom control also includes the "Tooltip" functionality. Tooltips are small textboxes located near each button. The tooltips are made invisible. The visibility of an appropriate tooltip is turned on after user holds a mouse pointer over the same button for longer than 1 second. Tooltip visibility is turned back off after the mouse pointer moved away from the button.

Every time the avatar's scale or position is changed, JavaScript will save this information. When the user clicks the "SAVE CHANGES" button on the avatar remote control, this information is being stored in the database and used in two ways:

When the user comes back to the avatar portal, the zoom/position information is being retrieved from the database and sent to the pan/zoom control. This initiates the control to the previously saved state. The same information is being sent to the Messenger, e.g., the YAHOO! Messenger, which also re-scales and re-positions the Messenger avatar to the saved scale and coordinates In one embodiment, the Messenger Host (e.g., avthost.swf) is similar to the Portal Avatar Host, except it does not have 35 layers. Pre-composed avatar file delivered by the server is loaded into avthost.swf as one piece. Messenger protocol receives information about the avatar's zoom and position coordinates, e.g., the pre-composed avatar is being rescaled and repositioned in exactly same way as the Portal Avatar.

The Messenger avatar is capable of displaying "dynamic moods and/or gestures" as discussed above. Dynamic moods and/or gestures are the same moods and/or gestures as can be seen on the avatar portal.

In one embodiment, all of the mood and/or gesture animations are contained within each avatar file, e.g., an avatar face file produced by various content providers. Each mood animation is placed into the designated fame of the Flash timeline. Also, each face file contains a "special" line of code, which makes the face accessible even in the server pre-composed file.

In one embodiment, the Messenger application forwards the text of each instant message to the avatar host, where it looks through the text for designated keywords and/or smileys. Each mood or gesture has a set of keywords/smileys that should trigger that mood or gesture. If such keyword is found, flash logic sends command to the face to go to the specific frame, in which the desired animation resides. After a specified amount of time (e.g., 7-8 seconds) Flash logic sends another command to the face, e.g., to go back to frame 1 (where the default mood animation is located). If the message contains more than one keyword/smileys, it will set the mood according to the last emoticon or keywords. As discussed above, the dynamic moods of avatars may be extended to "movement or gesture of the avatars," for example, to make an avatar dance when a user types certain keywords.

Figure 10:
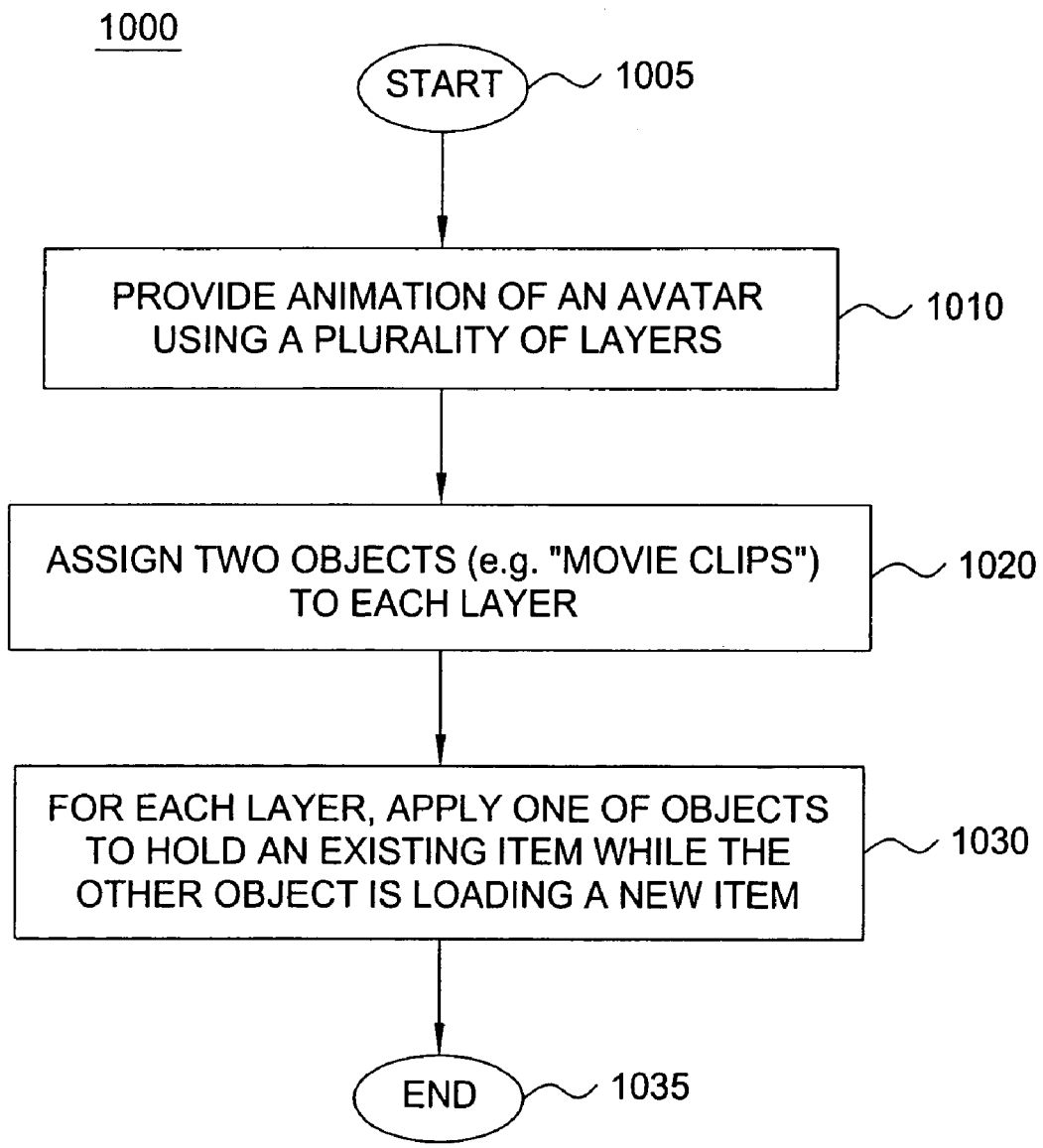
FIG. 10 illustrates a flow chart of an exemplary method for providing animation of an avatar that minimizes flickering.

FIG. 10 illustrates a flow chart of an exemplary method 1000 for providing animation of an avatar that minimizes flickering in accordance with the present invention. Method 1000 starts in step 1005 and proceeds to step 1010.

In step 1010, method 1000 provides animation of an avatar using a plurality of layers. For example, each layer is assigned to hold one item belonging to the avatar.

In step 1020, method 1000 assigns two objects to each layer. For example, each layer can be assigned two "MovieClip" objects which are Flash intrinsic objects that may contain a single or multiple graphics, static and/or animated.

In step 1030, method 1000 applies one of the objects to hold an existing item, e.g., a green dress, while the second object is applied to load a new item, e.g., a new blue dress. In one embodiment, the first object (e.g., called a waiter) must hold the existing item until the second object (e.g., called a catcher) has completed loading a new item. This step is discussed above in relation to the example of changing an avatar's dress from a green dress to a blue dress. Method ends in step 1035.

It should be noted that dynamic avatars (swf) require Macromedia plugins. Those plugins are bundled (come with) most Windows systems, however, a user who is using Linux, FreeBSD or other OS platforms, may need to download plugins from Macromedia in order to view Dynamic avatars.

Figure 11:
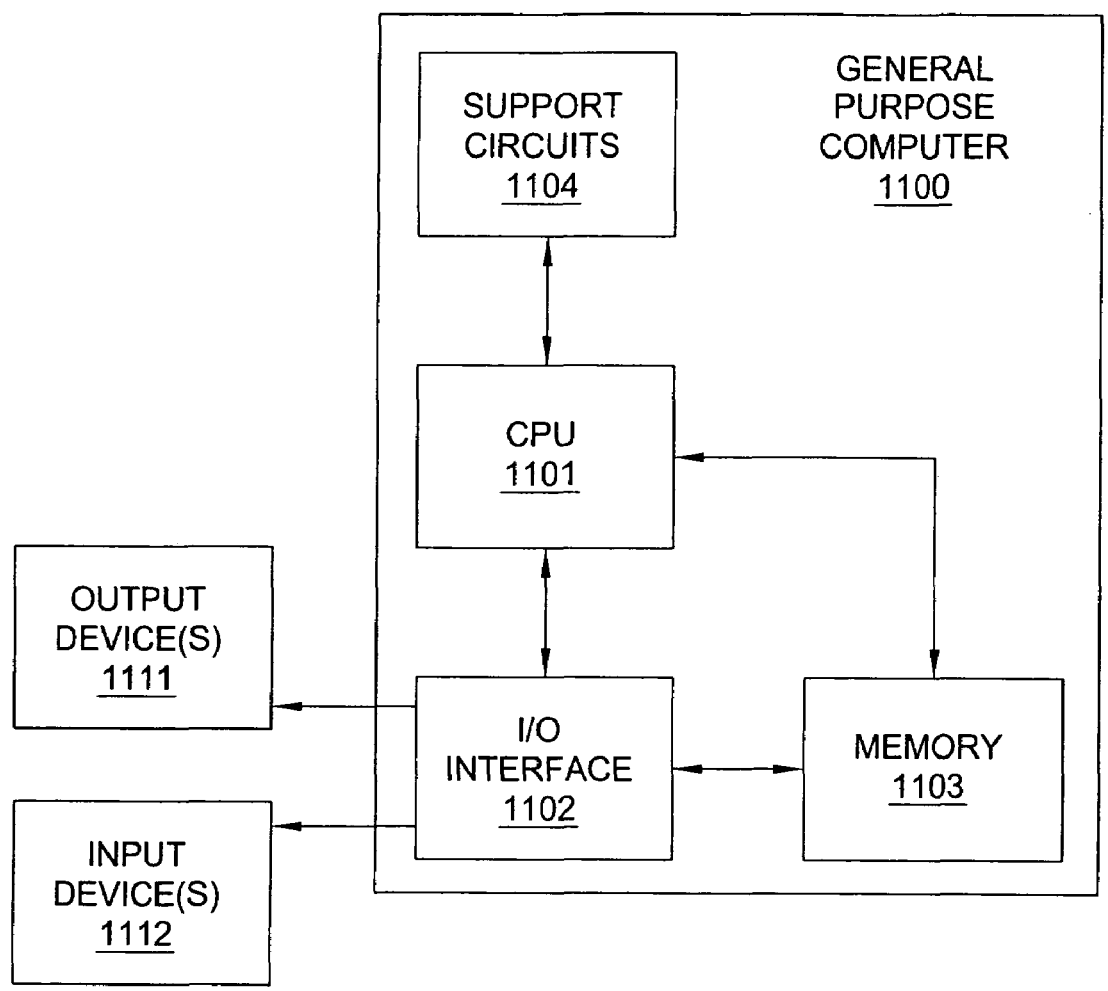
FIG. 11 illustrates the present invention implemented using a general purpose computer.

FIG. 11 is a block diagram depicting an exemplary embodiment of a general purpose computer 1100 suitable for implementing the processes and methods described above. The computer 1100 includes a central processing unit (CPU) 1101, a memory 1103, various support circuits 1104, and an I/O interface 1102. The CPU 1101 may be any type of microprocessor known in the art. The support circuits 1104 for the CPU 1101 may include conventional cache, power supplies, clock circuits, data registers, I/O interfaces, and the like. The I/O interface 1102 may be directly coupled to the memory 1103 or coupled through the CPU 1101. The I/O interface 1102 may be coupled to various input devices 1112 and output devices 1111, such as a conventional keyboard, mouse, printer, display, and the like.

The memory 1103 may store all or portions of one or more programs and/or data to implement the processes and methods described above. Although one or more aspects of the invention are disclosed as being implemented as a computer executing a software program, those skilled in the art will appreciate that the invention may be implemented in hardware, software, or a combination of hardware and software. Such implementations may include a number of processors independently executing various programs and dedicated hardware, such as ASICs.

The computer 1100 may be programmed with an operating system, which may be Windows NT, and Windows2000, WindowsME, and WindowsXP, among other known platforms. At least a portion of an operating system may be disposed in the memory 1103. The memory 1103 may include one or more of the following random access memory, read only memory, magneto-resistive read/write memory, optical read/write memory, cache memory, magnetic read/write memory, and the like, as well as signal-bearing media as described above.

An aspect of the present invention is implemented as a program product for use with a computer system. Program(s) of the program product defines functions of embodiments and can be contained on a variety of signal-bearing media, which include, but are not limited to: (i) information permanently stored on non-writable storage media (e.g., read-only memory devices within a computer such as CD-ROM or DVD-ROM disks readable by a CD-ROM drive or a DVD drive); (ii) alterable information stored on writable storage media (e.g., floppy disks within a diskette drive or hard-disk drive or read/writable CD or read/writable DVD); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct functions of the invention, represent embodiments of the present invention.

While the foregoing is directed to embodiments of the present invention, other and further embodiments of the invention may be devised without departing from the basic scope thereof, and the scope thereof is determined by the claims that follow.

The invention claimed is:

1. A computer-implemented method for animating an online identity, comprising:
    representing the online identity with at least one plurality of at least partially overlapping layers, wherein any portion of an item within one of the layers overlapped by a portion of an item in another layer is obscured from view;
    assigning a first multimedia animation component and a second multimedia animation component to a layer of said plurality of layers;
    applying the first multimedia animation component for holding an existing item that is displayed to a user while loading a new item in the second multimedia animation component; and
    at least partially in response to the new item being fully loaded in the second multimedia animation component, displaying the new item to the user and unloading the existing item from the first multimedia animation component.

2. The computer-implemented method of claim 1, wherein the first and second multimedia animation components are Flash objects.

3. The computer-implemented method of claim 2, wherein said Flash objects are MovieClip objects.

4. The computer-implemented method of claim 1, wherein said online identity is applied in an instant messenger (IM) application.

5. The computer-implemented method of claim 1, wherein said online identity is applied in a mobile instant messenger (IM) application.

6. The computer-implemented method of claim 1, wherein said online identity is applied in an interactive game application.

7. The computer-implemented method of claim 1, wherein said existing item or said new item comprises at least one of: a clothing item, an accessory item and a background.

8. A computer-readable storage medium having stored thereon a plurality of instructions, the plurality of instructions including instructions which, when executed by a processor, cause the processor to enable animation of an online identity, the instructions for:
    representing the online identity with at least one plurality of at least partially overlapping layers, wherein any portion of an item within one of the layers overlapped by a portion of an item in another layer is obscured from view;
    assigning a first multimedia animation component and a second multimedia animation component to a layer of said plurality of layers;
    applying the first multimedia animation component for holding an existing item that is displayed to a user while loading a new item in a the second multimedia animation component; and
    at least partially in response to the new item being fully loaded in the second multimedia animation component, displaying the new item to the user and unloading the existing item from the first multimedia animation component.

9. The computer-readable storage medium of claim 8, wherein the first and second multimedia animation components are Flash objects.

10. The computer-readable storage medium of claim 9, wherein said Flash objects are MovieClip objects.

11. The computer-readable storage medium of claim 8, wherein said online identity is applied in an instant messenger (IM) application.

12. The computer-readable storage medium of claim 8, wherein said online identity is applied in a mobile instant messenger (IM) application.

13. The computer-readable storage medium of claim 8, wherein said online identity is applied in an interactive game application.

14. The computer-readable storage medium of claim 8, wherein said existing item or said new item comprises at least one of: a clothing item, an accessory item and a background.

15. An apparatus for animating an online identity; comprising:
    means for representing the online identity with at least one plurality of at least partially overlapping layers, wherein any portion of an item within one of the layers overlapped by a portion of an item in another layer is obscured from view;
    means for assigning a first multimedia animation component and a second multimedia animation component to a layer of said plurality of layers;

means for applying the first multimedia animation component for holding an existing item that is displayed to a user while loading a new item in the second multimedia animation component;

means for displaying, at least partially in response to the new item being fully loaded in the second multimedia animation component, the new item to the user; and means for unloading, at least partially in response to the new item being fully loaded in the second multimedia animation component, the existing item from the first multimedia animation component.

16. The apparatus of claim 15, wherein the first and second multimedia animation components are Flash objects.

17. The apparatus of claim 16, wherein said Flash objects are MovieClip objects.

18. The apparatus of claim 15, wherein said online identity is applied in an instant messenger (IM) application.

19. The apparatus of claim 15, wherein said online identity is applied in a mobile instant messenger (IM) application.

20. The apparatus of claim 15, wherein said online identity is applied in an interactive game application.

21. The apparatus of claim 15, wherein said existing item or said new item comprises at least one of: a clothing item, an accessory item and a background.

* * * * *